Jan. 18, 1927.  
E. ABBOTT  
1,614,639  
RADIUS ROD AND FRONT AXLE BRACING MEANS  
Filed Oct. 23, 1925
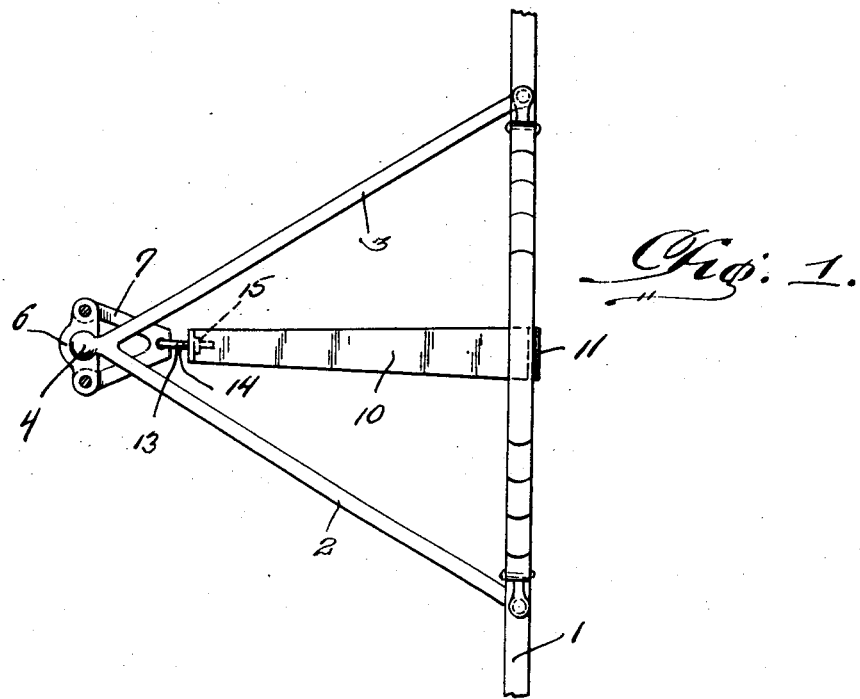
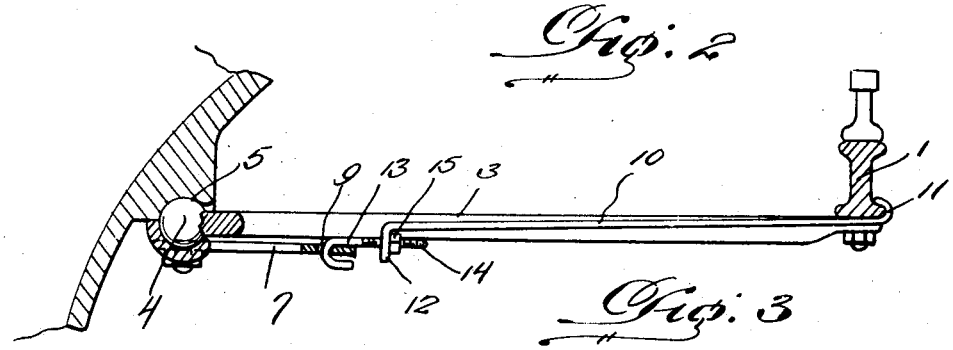
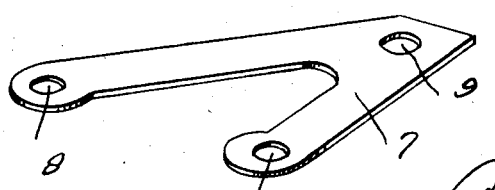
Earl Abbott, Inventor
By Clarence A. O'Brien, Attorney Patented Jan. 18, 1927.

UNITED STATES PATENT OFFICE.

EARL ABBOTT, OF GOSHEN, INDIANA.

RADIUS-ROD AND FRONT-AXLE BRACING MEANS.

Application filed October 23, 1925. Serial No. 64,388.

This invention relates to improvements in means for supporting and bracing the radius rod and front axle of a motor vehicle preferably of the Ford type.

One of the important objects of the present invention is to provide a means of the above mentioned character, which will prevent the buckling of the radius rod and furthermore will aid in supporting the same in a rigid position on the motor vehicle against accidental disengagement from its support.

A further object of the invention is to provide a bracing means of the above mentioned character, which may be readily and easily attached in position, and when in use will enable the motor vehicle to be steered more easily and furthermore eliminate any rattle which may be caused by loosely connected radius rods.

A still further object is to provide a bracing means of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a top plan view of my improved invention.

Figure 2 is a side elevation thereof showing the manner in which the same is associated with the radius rod and front axle of an automobile, and Figure 3 is a detail perspective view of the substantially V-shaped plate.

In the drawing wherein for the purpose of illustration is shown the preferred embodimen of my invention, the numeral 1 designates the front axle of a motor vehicle preferably of the Ford type, and the same is substantially of I-beam design in cross section in the manner clearly illustrated in Figure 2 of the drawing. Fastened to the bottom of the front axle 1 in the usual manner are the forward ends of the radius rods 2 and 3 respectively. The radius rods converge toward their rear ends and terminate in a ball shaped head 4. For the purpose of retaining the ball shaped head 4 in proper position in the socket 5 provided therefor in the crank case, the usual cap 6 is provided and as the same is well known in the art, a further detailed description thereof is not thought necessary.

The bracing means which I have provided for the radius rod and the front axle comprises a substantially V-shaped metallic plate designated generally by the numeral 7 and the free ends of the arms thereof are provided with the openings 8 whereby the V-shaped member may be secured to the radius rod ball cap 6 in the manner clearly illustrated in Figure 1. The substantially V-shaped member disposed in a horizontal plane below the converging rear ends of the radius rod and the apex of the same is provided with an opening 9, the purpose of which will hereinafter be more fully described.

The bracing member 10 comprises an elongated bar or strip of iron, the forward end of which is curved upwardly to provide a hook 11 for engagement with the front axle 1 at the intermediate portion thereof in the manner clearly illustrated in Figure 2. The bracing member 10 extends longitudinally and centrally between the converging radius rods 2 and 3 and tapers gradually toward its rear end and terminates in the depending portion 12, the same being spaced from the forward end of the V-shaped plate 7.

Extending through a suitable opening provided in the depending portion 12 formed on the rear tapered end of the bracing member 10 is the hook 13 which extends through the opening 9 provided in the apex of the V-shaped plate 7 and the shank portion of the hook is threaded as illustrated at 14 for receiving the adjusting nut 15 whereby the bracing member 10 and the V-shaped plate 7 may be secured together in a rigid position.

It will thus be seen from the foregoing description, that a bracing means for the radius rod and front axle of an automobile, preferably of the Ford type has been provided which may be readily and easily placed in position on the automobile and will at all times be positive and efficient in carrying out the purposes for which the same is designated. Furthermore, the simplicity in which my device is constructed enables the parts to be easily and quickly adjusted and will at all times be strong and durable.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In combination with the rearwardly converging radius rod, the cap for receiving the ball shaped head formed on the rear ends of the converging rods, and the front axle of a motor vehicle, bracing means therefor comprising a member secured to the cap and extending below the rear converging ends of the rods, a brace extending longitudinally between the rods, the forward end of the brace being curved upwardly for engagement with the front axle, the rear end of the brace being disposed downwardly, and an adjustable securing means between said member and the depending portion on the rear end of the brace.

2. In combination with the rearwardly converging radius rod, the cap for receiving the ball shaped head formed on the rear ends of the converging rods, and the front axle of a motor vehicle, bracing means therefor comprising a substantially V-shaped plate, the free ends of the arms thereof being secured to said cap, the plate being disposed forwardly of the cap and below the converging rear ends of the rods, a brace extending longitudinally and centrally between the rods, the front end of said brace being curved upwardly for engagement with the front axle, the rear end of the brace being disposed downwardly, and adjustable securing means between the apex of the substantially V-shaped plate and the downwardly disposed rear end of the brace.

3. In combination with the rearwardly converging radius rod, the cap for receiving the ball shaped head formed on the rear ends of the converging rods, and the front axle of a motor vehicle, bracing means therefor comprising a substantially V-shaped plate, the free ends of the arms thereof being secured to said cap, the plate being disposed forwardly of the cap and below the converging rear ends of the rods, a brace extending longitudinally and centrally between the rods, the front end of said brace being curved upwardly for engagement with the front axle, the rear end of the brace being disposed downwardly, adjustable securing means between the apex of the substantially V-shaped plate and the downwardly disposed rear end of the brace, said securing means comprising a hook extending through an opening provided in the apex of the V-shaped plate, the shank of said hook being threaded and extending through an opening provided in the depending rear portion of the brace, and an adjusting nut, threaded on the threaded shank of the hook and engaging the depending portion of the brace.

In testimony whereof I affix my signature.

EARL ABBOTT.